(12) United States Patent
Agarwal et al.

(10) Patent No.: US 12,189,764 B2
(45) Date of Patent: Jan. 7, 2025

(54) DETECTING AND MITIGATING MEMORY ATTACKS

(71) Applicant: Microsoft Technology Licensing, LLC, Redmond, WA (US)

(72) Inventors: Ishwar Agarwal, Redmond, WA (US); Stefan Saroiu, Redmond, WA (US); Alastair Wolman, Seattle, WA (US); Daniel Sebastian Berger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 17/828,903

(22) Filed: May 31, 2022

(65) Prior Publication Data

US 2023/0385206 A1 Nov. 30, 2023

(51) Int. Cl.
*G11C 8/20* (2006.01)
*G06F 21/55* (2013.01)
*G11C 11/406* (2006.01)

(52) U.S. Cl.
CPC .......... *G06F 21/554* (2013.01); *G11C 8/20* (2013.01); *G11C 11/406* (2013.01); *G11C 11/40603* (2013.01); *G06F 2212/1052* (2013.01)

(58) Field of Classification Search
CPC ........... G06F 21/554; G06F 2212/1052; G11C 11/406; G11C 7/24; G11C 8/20; G11C 11/4078; G11C 11/40603
See application file for complete search history.

(56) References Cited

U.S. PATENT DOCUMENTS

| 2014/0281206 | A1  | 9/2014 | Crawford et al. |
| 2014/0281207 | A1* | 9/2014 | Mandava ................. G11C 7/02 711/106 |
| 2015/0109871 | A1* | 4/2015 | Bains ................ G11C 11/40611 365/222 |

(Continued)

OTHER PUBLICATIONS

"International Search Report and Written Opinion Issued in PCT Application No. PCT/US23/018422", Mailed Date: Jun. 9, 2023, 12 Pages.

(Continued)

*Primary Examiner* — Jay W. Radke
(74) *Attorney, Agent, or Firm* — Ray Quinney & Nebeker; James Bullough

(57) ABSTRACT

The present disclosure relates to systems and methods implemented on a memory controller for detecting and mitigating memory attacks (e.g., row hammer attacks). For example, a memory controller may track activations of row addresses within a memory hardware (e.g., a DRAM device) and determine whether a pattern of activations is indicative of a row hammer attack. This is determined using a counting mode for corresponding memory sub-banks. Where a likely row hammer attack is detected, the memory controller may activate a sampling mode (rather than the counting mode) for a particular sub-bank to identify which of the row addresses should be refreshed on the memory hardware. The implementations described herein provide a low computational cost alternative to heavy-handed detection mechanisms that require access to significant computing resources to accurately detect and mitigate row hammer attacks.

20 Claims, 8 Drawing Sheets

(56) References Cited

U.S. PATENT DOCUMENTS

| | | | | |
|---|---|---|---|---|
| 2017/0103795 A1* | 4/2017 | Crawford | ................. | G11C 7/02 |
| 2022/0050793 A1* | 2/2022 | Saroiu | ................. | G06F 12/0893 |
| 2022/0383935 A1* | 12/2022 | You | .................... | G06F 12/0246 |
| 2023/0047007 A1* | 2/2023 | Lovett | ............... | G11C 11/40615 |

OTHER PUBLICATIONS

"Misra-Gries Summary", Retrieved From: https://web.archive.org/web/20220123052226/https://en.wikipedia.org/wiki/Misra%E2%80%93Gries_summary, Jan. 23, 2022, 3 Pages.

Kim, et al., "Revisiting RowHammer: An Experimental Analysis of Modern DRAM Devices and Mitigation Techniques", In Proceedings of ACM/IEEE 47th Annual International Symposium on Computer Architecture, May 30, 2020, pp. 638-651.

Saroiu, Stefan, "Are We Susceptible to Rowhammer? An End-to-End Methodology for Cloud Providers", Retrieved From: https://www.youtube.com/watch?v=duNJzNkVKbQ, Oct. 24, 2019, 7 Pages.

\* cited by examiner

DETECTING AND MITIGATING MEMORY ATTACKS

BACKGROUND

Recent years have seen a rise in the use of computing devices (e.g., mobile devices, personal computers, server devices, cloud computing systems) to receive, store, edit, transmit, process, or otherwise utilize digital data for various processing applications and services. Indeed, it is now common for individuals and businesses to employ the use of computing resources on cloud computing architectures and on a variety of computing devices. As demand for memory resources grows, memory resources continue to expand in availability and complexity across a variety of computing platforms.

In some memory systems, a number of security exploits have been used to take advantage of unintended and/or undesirable side effects in dynamic random access memory (DRAM) hardware. As an example, some malicious actors have found ways to corrupt data in memory cells by using row hammer attacks. These attacks typically involve rapidly activating one or more memory rows numerous times in quick succession to cause charges from nearby memory cells to leak and ultimately corrupt the data thereon. Moreover, as DRAM fabrication processes continues to shrink, row hammer attacks have the potential to impact a higher number of memory cells.

Detecting and mitigating row hammer attacks poses a significant challenge for memory systems. For example, conventional approaches often involve expending significant processing resources (e.g., memory hardware) to accurately identify specific aggressor rows (i.e., rows with high rates of activations) or victim rows (i.e., rows under attack). Alternatively, where conventional systems do not dedicate significant hardware resources to identifying and stopping row hammer attacks, these systems can easily become overwhelmed, particularly where hardware is operating outside of normal operating conditions or where the hardware is being accessed in a non-conventional manner.

These and other problems exist in connection with detecting and mitigating memory attacks, and particularly with regard to detecting and mitigating row hammer attacks.

DETAILED DESCRIPTION

Figure 1:
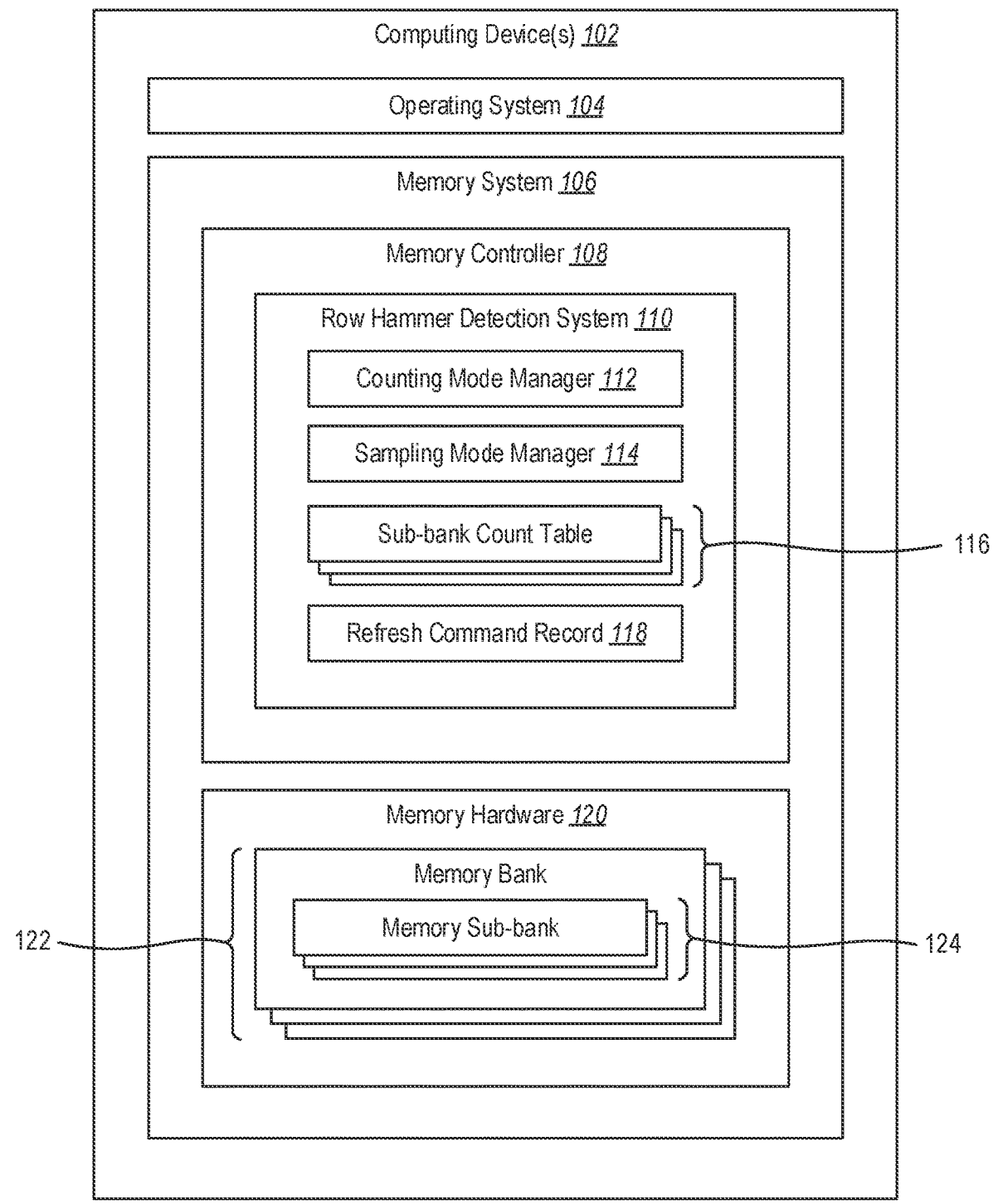
FIG. 1 illustrates an example computing device environment including a memory system having a memory controller that includes a row hammer detection system implemented thereon.

The present disclosure is generally related to detecting and mitigating memory attacks (e.g., row hammer attacks) on a memory system. For example, one or more embodiments described herein relate to features and functionalities implemented by a memory controller to track activations (e.g., reads) of memory addresses (e.g., row addresses) within a memory hardware (e.g., dynamic random access memory (DRAM)) and determine if a pattern of accesses are indicative of a row hammer attack.

As will be discussed in further detail herein, a memory controller may implement an access counting mode that involves tracking counts of instances in which particular memory row addresses are activated over a duration of time and predicting, based on the tracked counts, whether a row hammer attack is happening for a given memory sub-bank. Upon determining that a row hammer attack may be happening (e.g., based on certain counts exceeding a threshold value), the memory controller can activate a sampling mode for the memory sub-bank in which a random number is compared against a sampling threshold to determine whether to report a particular row address as an aggressor row address involved in a row hammer attack.

As an illustrative example, the present disclosure describes a row hammer detection and mitigation system (or simply a "row hammer detection system" as used herein) for detecting and mitigating a row hammer attack on one or more memory rows of a dynamic random access memory (DRAM) device. In one or more embodiments, the row hammer detection system may maintain an access count table for a memory sub-bank (e.g., each sub-bank of a plurality of sub-banks), which includes a plurality of access counts for memory addresses (e.g., row addresses) of the memory sub-bank as well as a spillover count indicating a count of accesses for one or more memory addresses not represented by the plurality of access counts for corresponding memory addresses. As used herein, an access count may refer to an activation count or, more specifically, a row activation count for a corresponding row of memory. Thus, while one or more embodiments described herein refer specifically to access counts, it will be understood that this may refer specifically to a row activation count or count of row activations for a given row address.

The row hammer detection system may consider values from the access count table to determine (e.g., predict) that a row hammer attack is happening (or likely happening) and take appropriate action. For example, in one or more embodiments described herein, the row hammer detection system may determine that the spillover count from an access count table exceeds a threshold count and, based on the spillover count exceeding the threshold, activate a sampling mode for the memory sub-bank. As will be discussed in further detail below, the row hammer detection system may activate the sampling mode by generating random number(s) and determining if the random number(s) fall within a sampling threshold. Where the random number(s) falls within the predetermined threshold, the row hammer detection system may report a memory row address as a likely aggressor row in a row hammer attack. Additional detail will be discussed below in connection with various examples.

The present disclosure includes a number of practical applications that provide benefits and/or solve problems associated with detecting and mitigating row hammer attacks taking place on memory sub-banks of a memory hardware. Examples of some of these applications and benefits are discussed below.

For example, by transitioning between an access counting mode (or simply a "counting mode") and a sampling mode, the row hammer detection system can provide a low computational cost alternative to maintaining an expensive and robust record of activations for a memory bank or plurality of memory banks. Indeed, where conventional methods typically involve maintaining a large record of access instances for one or more entire memory banks to ensure that a specific instance of a row hammer attack is detected, the row hammer detection system transitions between a counting mode and a sampling mode using a hybrid scheme to predict that a row hammer attack is potentially happening and allows the row hammer detection system to identify a location of the attack within an acceptable amount of time.

In addition, rather than tracking access counts for an entire memory system or for entire memory banks, the row hammer detection system may track activations on a sub-bank level. This smaller scale tracking methodology allows the row hammer detection system to maintain access counts using smaller count tables that are maintained for corresponding memory sub-banks. Tracking and detecting row hammer attacks at a sub-bank level allows the row hammer detection system to activate a sampling mode for an associated sub-bank that becomes overwhelmed while allowing other sub-banks to be monitored using the counting mode. Further, features of the systems described herein reduce the associativity of the table from potentially thousands down to a much smaller amount (e.g., 16, 32) while reducing a total number of counters (e.g., by a factor of 20 or 30). This reduced associativity additionally enables the systems described herein to meet the performance needs of a memory controller, which would be difficult or impossible with conventional approaches.

As noted above, and as will be discussed in further detail below, one or more embodiments described herein involve implementation of a hybrid scheme in which a memory controller transitions between a counting mode and a sampling mode in detecting a potential row hammer attack. This hybrid approach enables a memory controller to maintain access count tables without consuming or otherwise occupying a massive quantity of memory resources that conventional approaches would otherwise require. For example, where a conventional approach that relies exclusively on a heavy-hitting counting mode would require 10s of Megabytes (MBs) of static random access memory (SRAM) to reliably detect instances of row hammer attacks, the approaches described herein involve a much smaller scale of SRAM resources to track access counts across multiple memory sub-banks. Indeed, features of the row hammer detection system with regard to implementing a hybrid detection scheme on a sub-bank level can reduce the quantity of SRAM needed to detect and mitigate row hammer attacks for similarly sized memory banks by a scale of $\frac{1}{100}^{th}$ or $\frac{1}{100}^{th}$ over conventional approaches. Indeed, as mentioned above, implementing the hybrid scheme described herein can reduce the number of counters by a factor of 20, 30, or more over conventional approaches.

Furthermore, features of the row hammer detection system reduce computational and hardware expenses on a memory controller while still maintaining a very low probability that a row hammer attack will go unchecked. For example, by identifying a specific memory sub-bank that may be affected by a row hammer attack and then selectively activating a sampling mode for the memory sub-bank, the row hammer detection system can implement a sampling mode on a sub-bank level without interrupting operation on the other sub-banks of the memory hardware. This allows the row hammer detection system to implement the sampling mode on a smaller portion of the memory hardware using a sampling threshold that nearly guarantees a row hammer attack will be found and prevented before causing data corruption on nearby memory cells.

Moreover, as will be discussed in further detail below, one or more embodiments described herein include features and capabilities that allow for detection and mitigation of row hammer attacks without requiring that the memory hardware share or make available all hardware and topology information to a memory controller. For example, by identifying a specific row (and/or blast radius) of memory that is predicted to be an aggressor row in a row hammer attack, the row hammer detection system can issue a command to the memory hardware that allows the memory hardware to locally take steps and mitigate the identified row hammer attack. As noted above, this command may be issued without requiring that the hardware share certain information with the memory controller that certain hardware vendors prefer to avoid sharing. Further, this allows the row hammer detection system to be implemented on memory controllers across a variety of hardware architectures to detect and mitigate a variety of memory attacks across different computing devices.

As illustrated in the foregoing discussion, the present disclosure utilizes a variety of terms to describe features and advantages of the systems herein. Additional detail is now provided regarding the meaning of some example terms.

For example, a "computing device" may refer to a computing node, a server node, a host device, or any electronic device having memory hardware thereon (or accessible thereto). In one or more embodiments described herein a computing device may refer to a server device on a network of connected network devices (e.g., a cloud computing system). Alternatively, a computing device may refer to a mobile or non-mobile device, such as a laptop, desktop, phone, tablet, or other device capable of accessing memory resources of one or more memory devices. Additional detail in connection with some general features and functionalities of a computing device will be discussed below in connection with FIG. 8.

As used herein, "memory hardware" or "memory resource(s)" may refer to accessible memory across one or more computing devices. For example, memory hardware may refer to a local memory store having blocks of memory that are accessible to applications or an operating system on a computing device. The memory hardware may refer to memory that is managed by one or more integrated memory controllers (or simply "memory controllers") that are co-located on a memory system or otherwise implemented on a computing device. A memory device may refer to any memory resource managed by a memory controller including local, external, remote, or pooled memory that is accessible to one or multiple computing devices. Indeed, a memory hardware may refer to any memory device managed by the memory controller.

A memory hardware may refer to a memory resource of a variety of memory types. For example, in one or more embodiments described herein, a memory device may refer to dynamic access memory (DRAM), static random access memory (SRAM), flash memory, or other non-persistent memory source. In one or more embodiments, a memory system includes dual in-line memory module (DIMM) devices (or other device-types) that provide an accessible memory source. In one or more embodiments, a memory device may include multiple memory banks that provide portions of memory resources to various applications or processes.

As used herein, a "memory bank" may refer to a unit of memory on a memory hardware. For example, a memory bank may refer to a logical partition of memory that is divided across multiple chips on a memory system. In one or more specific examples described herein, a memory bank refers to one of a plurality of similarly sized memory banks that represent a corresponding portion of the memory hardware. For example, in one or more embodiments, a memory hardware includes sixty-four (64) memory banks with each memory bank including eight (8) sub-banks. As used herein, a memory sub-bank may refer to a portion (e.g., a subset) of memory resources from a corresponding memory bank. It will be appreciated that while one or more embodiments are described herein in connection with memory hardware having a specific number (e.g., 64) memory banks that each include eight memory sub-banks, other implementations may include any number of memory banks where one or more of the memory banks include a variable number of multiple memory sub-banks. It will also be appreciated that the memory banks and corresponding sub-banks may refer to a variety of different sized memory resources.

As will be discussed in connection with examples below, a memory controller may track a count of row activations (e.g., memory activations) across a plurality of memory sub-banks. In one or more embodiments, the memory controller may perform this tracking of access counts while operating in a counting mode. As used herein, a "counting mode" refers to an operational mode of the memory controller with respect to a corresponding memory sub-bank in which the memory controller tracks counts of row activations of the memory sub-bank. For example, as will be discussed below, the row hammer detection system can maintain an access count table that includes a plurality of counts for corresponding memory addresses (e.g., memory row addresses). The access count table may additionally include a spillover count.

In one or more embodiments, the row hammer detection system may cause the memory controller to transition to or otherwise activate a sampling mode. As used herein, a "sampling mode" refers to an operational mode of the memory controller with respect to a corresponding memory sub-bank in which the memory controller generates a random number for activated rows and compares the random number to a sampling threshold. Based on the comparison, the memory controller can report the address/row by generating and issuing a refresh command indicating the memory address as a predicted aggressor row of a row hammer attack. After resolving the row hammer attack, the memory controller may return to the sampling mode for the corresponding memory sub-bank.

Additional detail will now be provided regarding example features and functionality of a row hammer detection system in relation to illustrative figures portraying example implementations. In particular, FIG. 1 illustrates an example implementation of a computing device 102 having an operating system 104 thereon. The computing device 102 may refer to any of a variety of computing devices discussed above. Further, the operating system 104 may refer to a system for managing software and hardware on the computing device 102. In addition to conventional features of conventional operating, one or more embodiments of the operating system 104 can facilitate transitioning between the memory controller operating in a counting mode or a sampling mode. Further detail in connection with causing the memory controller to transition between operational modes will be discussed below.

As further shown in FIG. 1, the computing device(s) 102 includes a memory system 106. The memory system includes a memory controller 108 and memory hardware 120. In addition to the features that will be discussed in connection with detecting and mitigating row hammer attacks, the memory controller 108 may generally control flow of data to and from the memory hardware 120. For example, the memory controller 108 may manage read and write operations to the memory hardware 120. The memory controller 108 may also track and manage data associated with reading and writing to the memory hardware 120. The memory controller 108 may further implement error detection and correction features with respect to the memory resources on the memory hardware 120.

As noted above, and as will be discussed in further detail below, the memory controller 108 may provide features related to detecting and mitigating row hammer attacks on the memory hardware 120. For example, as shown in FIG. 1, the memory controller 108 includes a row hammer detection system 110. As will be discussed in further detail below, the row hammer detection system 110 may implement features and functionality related to detecting and mitigating row hammer attacks. As noted above, the row hammer detection system 110 may implement a variety of operational modes in detecting and mitigating row hammer attacks.

As shown in FIG. 1, the row hammer detection system 110 may include a counting mode manager 112. The counting mode manager 112 may implement a counting mode in which counts for addresses (e.g., row addresses) are maintained within access count tables for a plurality of memory sub-banks on the memory hardware 120. In particular, the counting mode manager 112 may determine estimate counts for a plurality of row addresses of corresponding memory sub-banks and determine, based on the estimated activation counts and a corresponding spillover account, whether a particular sub-bank is being overwhelmed by a potential row hammer attack. Additional detail in connection with the counting mode will be discussed in detail below.

As further shown in FIG. 1, the row hammer detection system 110 may include a sampling mode manager 114. The sampling mode manager 114 may implement a sampling mode for one or more memory sub-banks that become overwhelmed when maintaining access counts within corresponding access count tables. In particular, upon detecting a potential row hammer attack on an address (e.g., a row address) for an associated memory sub-bank, the sampling mode manager 114 may apply a sampling mode in which a random number is generated for each memory row access and compared against a sampling threshold. Based on the comparison, the sampling mode manager 114 may estimate that a row hammer attack is occurring on the associated memory address and generate a refresh command to send to the memory hardware 120. Additional detail in connection with the sampling mode will be discussed in detail below.

As shown in FIG. 1, the row hammer detection system 110 may include a plurality of sub-bank count tables 116. The sub-bank count tables 116 may include records of memory addresses (e.g., row addresses) and corresponding row activation accounts for an associated period of time. The sub-bank count tables 116 may additionally include spillover counts for each of the corresponding sub-banks. As will be discussed in further detail below, the row hammer detection system 110 (e.g., the counting mode manager 112) may consider the counts of the corresponding row addresses in combination with a spillover count to determine whether an address from a particular sub-bank has an aggressor memory address (e.g., an aggressor row) that is part of a row hammer attack.

As shown in FIG. 1, the row hammer detection system 110 may additionally include a plurality of refresh command tables 118. As noted above, upon detecting a row hammer attach and identifying a likely aggressor row, the row hammer detection system 110 may submit a refresh command to the memory hardware 120 that enables the memory hardware to mitigate the row hammer attack. In one or more embodiments described herein, the row hammer detection system 110 may additionally maintain a record of refresh commands that are provided to the memory hardware 120. This refresh command table 118 may be used to limit a number of refresh commands executed on corresponding row addresses of the memory hardware 120. This enables the row hammer detection system 110 to comply with hardware specifications while avoiding a scenario in which the refresh commands may disrupt normal operation of the memory controller 108 and memory hardware 120.

As mentioned above, the memory system 106 includes a memory hardware 120 that provides memory resources to any of a variety of applications managed by the operating system 104. As noted above, the memory controller 108 may provide access to and control the flow of data between the operating system 104 and the memory hardware 120. As shown in FIG. 1, the memory hardware 120 may include a plurality of memory banks 122 with each memory bank including a plurality of memory sub-banks 124.

While one or more embodiments described herein refer to implementations of the memory hardware 120 including a specific number of memory banks 122 and corresponding sub-banks 124, it will be appreciated that the memory hardware 120 may include any number of memory banks and associated sub-banks. As noted above, a memory bank may refer to a logical partition of a memory resource from the memory hardware 120 with a memory sub-bank referencing a subset of the memory resource of a corresponding memory bank. In one or more embodiments described herein, the memory hardware 120 includes sixty-four memory banks with each memory bank having an associated set of eight memory sub-banks. These memory banks and associated sub-banks may represent similar sized resources or, alternatively, may differ in size within the memory hardware 120.

While FIG. 1 illustrates an example implementation of a computing device 102 in accordance with one or more embodiments, it will be understood that other implementations described herein may be implemented on a different environment of computing device(s). For instance, in one or more embodiments, the computing device(s) 102 may include multiple memory systems implemented on different memory devices (e.g., a pooled memory system) being accessible to one or more applications or virtual machines hosted by the computing device(s). In one or more embodiments, the environment may include multiple computing devices having access to memory resources on a single memory system. In each implementation, the memory hardware 120 may be managed by a corresponding memory controller 108 having a row hammer detection system 110 implemented thereon.

Figure 2:
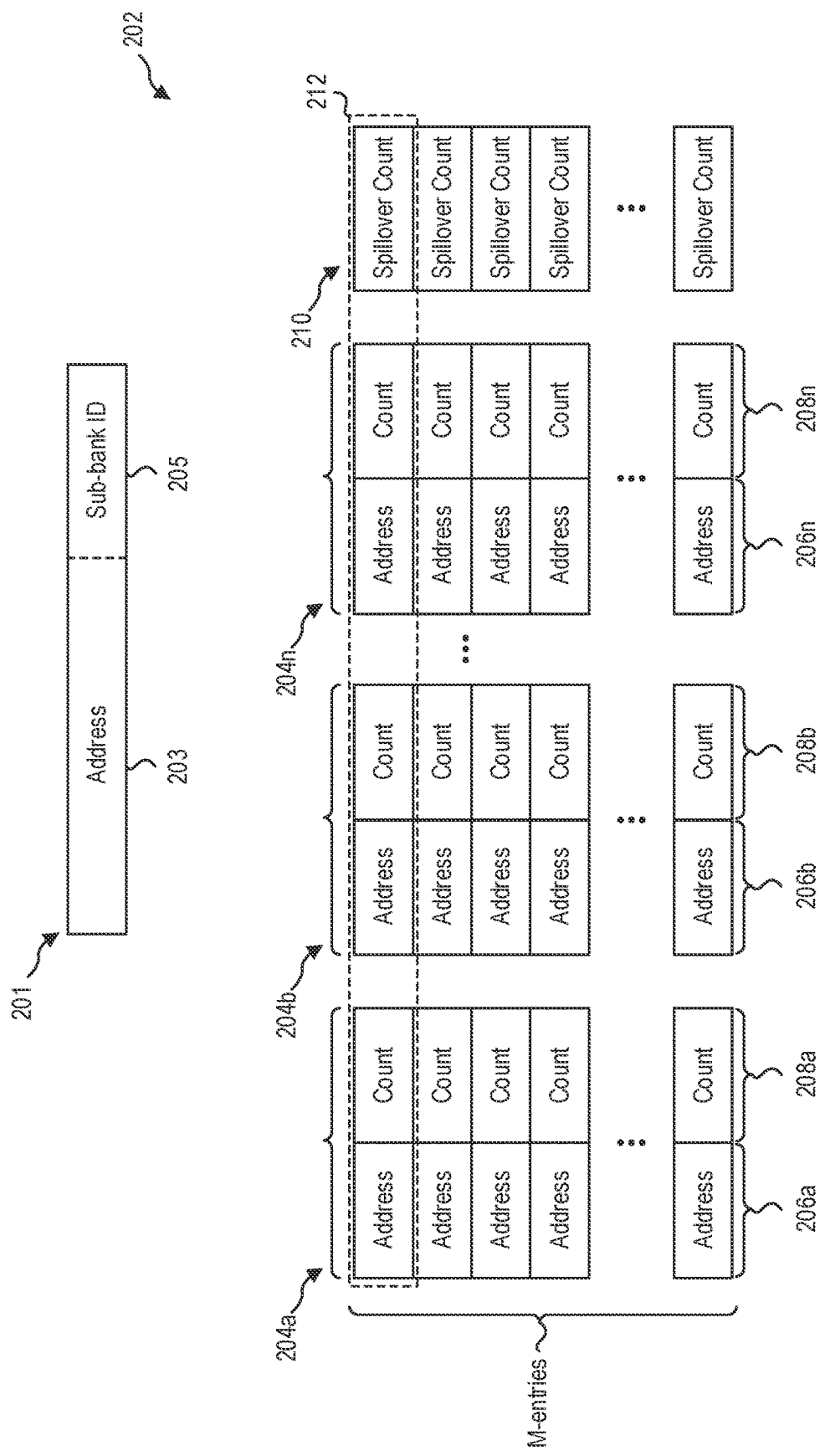
FIG. 2 illustrates an example implementation of an access count record showing a record of counts for corresponding row addresses across a plurality of memory sub-banks.

As noted above, the row hammer detection system 110 (e.g., the counting mode manager 112) may implement a counting mode to track activation counts for corresponding sub-banks 124 from the plurality of memory banks 122 on the memory hardware 120. FIG. 2 illustrates an example implementation showing an access count record 202 within which access counts are maintained for row addresses on the memory hardware 120.

As shown in FIG. 2, the access count record 202 includes a record of entries including row addresses and corresponding activation counts. For example, the access count record 202 includes a plurality of entry columns 204a-n including M-number of rows. As will be discussed in further detail below, each row of the different columns is associated with a corresponding memory sub-bank. Further, each entry column of the plurality of entry columns 204a-n correspond to a parallel way of a memory structure within the memory controller 108.

For example, in one or more embodiments, a number of entry columns 204a-n are based on a number of parallel ways that enables read access to all address values (e.g., all 16 address values) in parallel. In one or more embodiments described herein, the access count record 202 is maintained within a static random access memory (SRAM) structure having sixteen parallel points of access (e.g., sixteen parallel ways). In one or more embodiments, the size of the access count tables are determined based on the parallel capabilities of the SRAM structure. Thus, while one or more embodiments describe rows having sixteen entries representative of estimated activation counts for corresponding memory sub-banks, other implementations may have fewer or additional entries based on the SRAM structure having additional parallel ways.

As shown in FIG. 2, the plurality of entry columns 204a-n include columns of memory addresses 206a-n and corresponding access counts 208a-n. For example, a first entry column 204a may include a first set of addresses 206a and a corresponding first set of access counts 208a. The first set of addresses 206a may include row addresses from different sub-banks and associated access counts 208b indicating estimated activation counts for the corresponding row addresses. Similarly, a second access column 204b may include a second set of addresses 206b and a corresponding second set of access counts 208b. The access columns 204a-n may include any number of addresses and corresponding access counts up to an Nth set of addresses 206n and a corresponding Nth set of access counts 208n.

In addition to the addresses 206a-n and the corresponding access counts 208a-n, the access count record 202 may include a spillover column 210 indicating a spillover count for each of the rows of the access count record 202 corresponding to respective memory sub-banks. For example, a first row of the access count record 202 may include a first spillover count, a second row of the access count record 202 may include a second spillover count, and so on. As noted above, where a memory hardware 120 includes sixty-four memory banks that each include eight memory sub-banks, the access count record 202 may include five-hundred twelve rows that are each representative of a corresponding memory sub-bank. It will also be noted that each entry of a corresponding sub-bank is associated with a different entry column 204a-n accessible via a different parallel way of the memory controller hardware. This parallelism allows for fast access and update of the respective entries within the access count record 202.

FIG. 2 additionally illustrates an example row activation command 201 in accordance with one or more embodiments. In the illustrated example, the row activation command 201 includes a row address 203 and a sub-bank identifier 205. When a row is accessed, the row activation command 201 is sent by the memory controller 108. In the illustrated example, the sub-bank identifier 205 corresponds to the three least significant bits of the row activation command 201, which are used to identify a corresponding sub-bank. As noted above, each row of the access count record 202 corresponds to a sub-bank. Accordingly, the three least significant bits may be used to identify a specific row of the access count record 202. The row address 203 may then be evaluated and considered in updating one or more entries within a corresponding row of the access count record 202. Additional information in connection with which entry to update or, alternatively, to increment the spillover count, will be discussed below in connection with an example access count table for a corresponding sub-bank illustrated in FIG. 3.

As noted above, and as illustrated in FIG. 2, each row of the access count record 202 refers to an access count table for an associated memory sub-bank. In addition, as discussed above, upon receiving a row activation command 201, the row hammer detection system 110 may update a corresponding row of the access count record 202 (e.g., based on the sub-bank identifier 205 included within the row activation command 201). To further illustrate the process for updating a row from the access count record 202, additional information will be discussed in connection with an example row 212 of the access count record 202 corresponding to a first sub-bank represented within the access count record 202. By way of example, the example row 212 of entries is further illustrated in an example access count table shown in FIG. 3.

Figure 3:
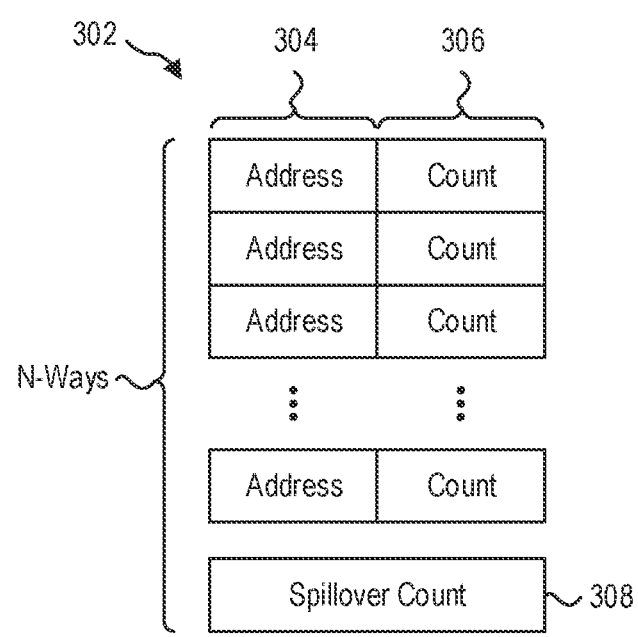
FIG. 3 illustrates an example access count table for a memory sub-bank represented within the access count record in accordance with one or more embodiments.

FIG. 3 illustrates an example access count table 302 in accordance with one or more embodiments described herein. As noted above, the access count table 302 may refer to one example of a row (e.g., the example row 212) from the access count record 202. In particular, the access count table 302 may include a plurality of entries with each entry corresponding to a respective way from an associated row of the access count record. Thus, as shown in FIG. 3, the access count table 302 may include a first row including an address and a count from a first row of the first way (Way 0), a second row including an address and count from the first row of the second way (Way 1) and so forth up to an Nth entry including an address and a count from the first row of the Nth way (Way N).

As shown in FIG. 3, the access count table 302 may include a plurality of entries including a first column of addresses 304 and a second column of counts 306. In addition, the access count table 302 may include a spillover entry 308 indicating a spillover count for the access count table 302.

While FIG. 3 illustrates an example access count table 302 including a table having sixteen entries and a spillover count, the access count table 302 may include any number of entries to track estimates for access counts associated with corresponding addresses. In the example shown, the number of entries in the access count table 302 may correspond to a number of parallel ways from the SRAM structure on the memory controller 120. In other implementations, the access count table 302 may include additional or fewer entries based on hardware specifications (e.g., dimensions of an SRAM structure) of the memory controller 120.

It will also be noted that the counts for the corresponding addresses represent estimates of counts for the associated addresses. For example, because the access count table 302 may include a number of entries that is significantly fewer than a number of row addresses for a corresponding sub-bank, the access count table 302 may rotate certain addresses out from the access count table 302 as activation commands (e.g., activation command 201) are detected. Additional detail discussing how the access count table 302 is updated is provided in further detail below in connection with FIG. 4.

Figure 4:
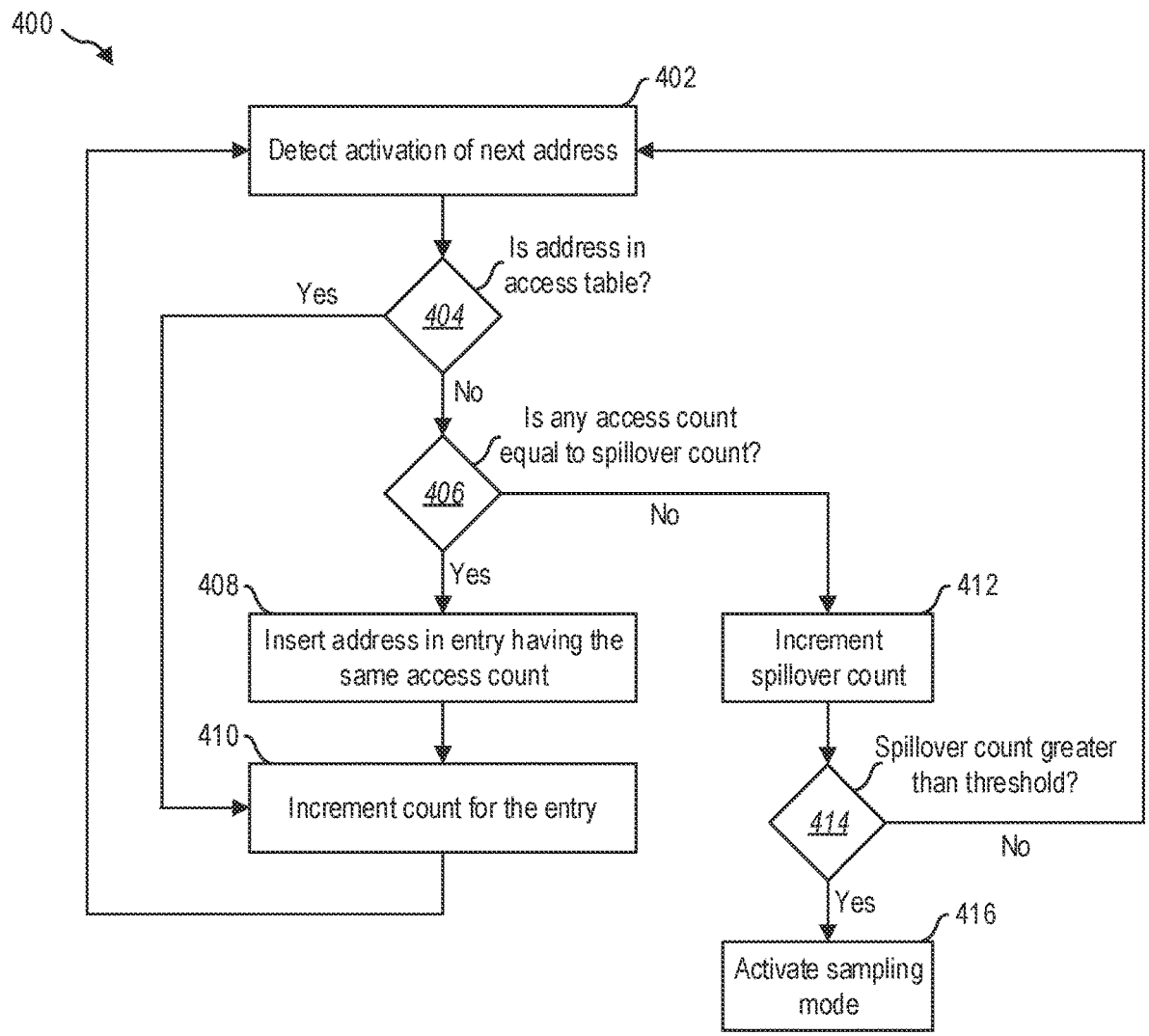
FIG. 4 illustrates an example series of acts for determining whether a possible aggressor row exists for a given memory sub-bank.

In particular, FIG. 4 illustrates an example series of acts 400 for updating respective entries of a corresponding access count table. More specifically, FIG. 4 illustrates an example implementation in which the row hammer detection system 110 maintains access counts for a corresponding memory sub-bank when engaged in a counting mode. In one or more embodiments, the row hammer detection system 110 engages the counting mode for each memory sub-bank as a default. The row hammer detection system 110 may implement the series of acts 400 for each row activation command received while in the counting mode.

As shown in FIG. 4, the row hammer detection system 110 may perform an act 402 of detecting activation of a next address. For example, in one or more embodiments, the row hammer detection system 110 may receive, detect, or otherwise identify a row activation command indicating a sub-bank and associated address (e.g., row address). In one or more embodiments, the row hammer detection system 110 may identify a particular access table (e.g., access count table 302) to update (e.g., a particular row of the access count record 202) based on the sub-bank identifier included within a row activation command.

Upon detecting activation of a next address, the row hammer detection system 110 may first perform an act 404 of determining whether an address in the memory sub-bank is available within the relevant access table. For example, the row hammer detection system 110 may compare the address portion of the row activation command with a set of addresses in a first column of the access count table and determine whether one of the addresses match the address from the row activation command. Where the address matches an existing address within the access count table (e.g., a 'yes' at act 404), the row hammer detection system 110 may perform an act 410 of incrementing a count for the row entry (of the matching address). In other words, the row hammer detection system 110 may increment a count estimate for the matching address within the access count table. As shown in FIG. 4, after incrementing the count for the row entry, the row hammer detection system 110 may return to perform act 402 with respect to a next row activation.

Alternatively, where the row hammer detection system 110 determines that the address does not match an existing address within the access count table (e.g., a 'no' at act 404), the row hammer detection system 110 may perform additional steps in connection with updating the access count table. For example, as shown in FIG. 4, the row hammer detection system 110 may perform an act 406 of determining whether any of the counts within the table entries of the access count table are equal to the spillover count. More specifically, the row hammer detection system 110 may query the counts of the table and, if any of the counts for the corresponding addresses are equal to the spillover count, the row hammer detection system 110 may perform an act 408 of inserting an address of the detected row activation in an address field of the corresponding entry (or one of the address fields having counts that match the spillover count). The row hammer detection system 110 may then proceed to perform the act 410 of incrementing the count for the new row entry. As shown in FIG. 4, after incrementing the count for the row entry, the row hammer detection system 110 may return to perform act 402 with respect to a next row activation.

Returning to act 406, where the row hammer detection system 110 determines that there is not a table entry that is equal to the spillover count, the row hammer detection system 110 may perform an act 412 of incrementing the spillover count. As is evident from the illustrated series of acts 400, the spillover count should generally be the lowest count (or equal to the lowest count) of any of the entries within the access table. Further, it is noted that one of the entries (e.g., either an address count or the spillover count) should increment with each row activation. Moreover, while entries within the access count table may be replaced with any address of a corresponding sub-bank (e.g., as indicated at act 408), it will be appreciated that the specific counts for the corresponding addresses within the access count table are reflective of upper-bound estimates for the addresses represented within the access count table at any time. Thus, while the access counts are not necessarily reflective of an exact number of activations for a particular row address, the access counts do represent an upper-bound estimate for the corresponding row addresses.

As shown in FIG. 4, the row hammer detection system 110 may perform an act 414 of determining whether the spillover count for the access count table is greater than (or equal to) a threshold count. Where the spillover count is not over the threshold count, the row hammer detection system 110 may return to perform act 402 with respect to a next row activation. Conversely, where the spillover count is greater than (or equal to) a threshold count, the row hammer detection system 110 may perform an act 416 of activating a sampling mode. Additional information in connection with implementing the sampling mode is discussed below.

It will be noted that the spillover count may be considered as a metric for determining whether the counting method is becoming overwhelmed by a potential row hammer attack. In one or more embodiments, the spillover count being at or above a threshold count may not mean that a row hammer attack is necessarily happening, but that a row hammer attack may be happening (or is predicted to be happening) based on non-normal read or write behavior that the counting mode is not fully-equipped to handle. This may be caused by a row hammer attack or, alternatively, may be caused by other read and/or write behavior with respect to row addresses of a particular sub-bank.

While not shown in FIG. 4, it will be understood that the series of acts 400 may be performed with respect to a certain interval of time. For example, in one or more embodiments, the access count table may be cleared at periodic intervals, which may include resetting the access counts and the spillover count to zero. The row hammer detection system 110 may determine a specific interval of time based on specifications of the memory hardware 120 and/or hardware of the memory controller 108 (e.g., the SRAM structure).

While the clearing interval may vary from system to system, in one or more embodiments described herein, the row hammer detection system 110 resets the counts of the access count table every refresh window depending on specifications or a generation of the DRAM hardware (e.g., 32 milliseconds in DDR5, 64 milliseconds in DDR4). In one or more implementations, the row hammer detection system 110 resets the access counts for the associated memory sub-bank based on determining that the row hammer detection system 110 is engaged in the counting mode for the corresponding sub-bank after the predetermined interval has passed. Thus, in one or more examples described herein, after 32 milliseconds have passed without the spillover count hitting or exceeding the threshold and triggering activation of the sampling mode, the row hammer detection system 110 may assume that a row hammer attack is not currently happening for an associated memory sub-bank and reset the counts and continue tracking counts as discussed above in connection with FIG. 4. In one or more embodiments, the row hammer detection system 110 clears the counters of the access count table using a counter invalid register (CIR) on the memory controller 108.

Moreover, it will be appreciated that the access counters may not clear simultaneous for each of the sub-banks. For example, the interval may be staggered between the different sub-banks. Some sub-banks may have different intervals than other sub-banks. In addition, as noted above, where the row hammer detection system 110 has activated a sampling mode for a given sub-bank, the row hammer detection system 110 may not reset the counts for the relevant sub-bank at the end of the predetermined interval. In one or more implementations, the row hammer detection system 110 may wait to receive specific instructions (e.g., from the memory hardware 120 or operating system 104) to transition back to the counting mode for the memory sub-bank.

Figure 5:
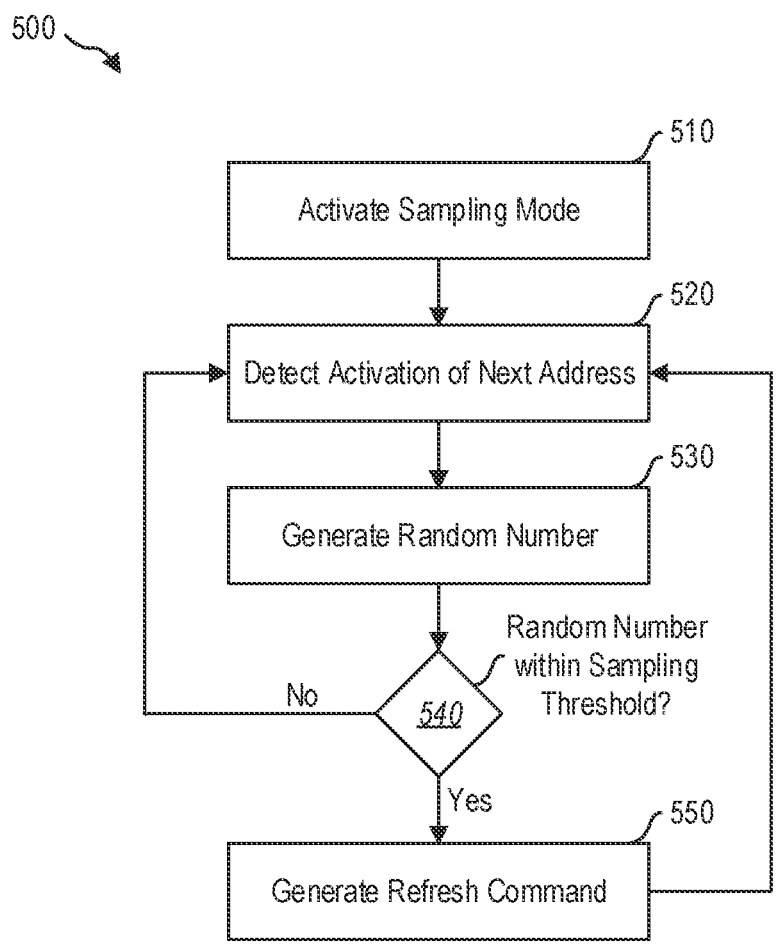
FIG. 5 illustrates an example series of acts for activating and implementing a sampling mode based on determining that a possible aggressor row exists for a given memory sub-bank.

FIG. 5 illustrates an example series of acts 500 that the row hammer detection system 110 may implement in response to detecting a trigger condition associated with transitioning from the counting mode to the sampling mode. For example, the row hammer detection system 110 may implement the series of acts 500 for a particular sub-bank based on detecting that a spillover count equals or exceeds a threshold value for a given interval of time (e.g., as shown in FIG. 4).

As shown in FIG. 5, the row hammer detection system 110 may perform an act 510 of activating a sampling mode. In one or more embodiments, activating the sampling mode involves determining one or more threshold and parameters associated with implementing the sampling mode. For example, the row hammer detection system 110 may define a sampling threshold that a random number may be compared against. In one or more embodiments, the sampling threshold is determined based on a maximum activation count (MAC) that the memory hardware 120 is configured to tolerate before bit values change as a result of a row hammer attack. For instance, as mentioned above, the MAC may refer to a metric that measures a number of activations a row can sustain until bits in an adjacent row (or within a certain blast radius) flip (e.g., from 0 to 1 or from 1 to 0).

As noted above, the sampling threshold may vary based on specifications of the memory hardware 120 and/or memory controller 108. As further mentioned above, the MAC value may be considered in determining the particular threshold value as well as the probability that a given random number will fall within the sampling threshold. In one or more embodiments, the threshold is set as MAC/4.4 based on an assumption that a row hammer attack may affect up to four rows. Other implementations may determine a slightly different threshold based on similar (or different) considerations unique to the memory hardware 120. As noted above, the MAC value may vary from device to device. Nonetheless, despite variable MAC values, sampling threshold values, and a sampling probability register value, it will be understood that one or more embodiments described herein may achieve a row hammer failure rate over a five-year lifetime of the memory hardware 120 that is less than 1e-10.

In addition to setting the sampling threshold, the row hammer detection system 110 may activate the sampling mode by setting an always sampling register (ASR) to an "on" value. While not expressly shown in FIGS. 4 and 5, in one or more embodiments, the row hammer detection system 110 may first view an ASR bit to determine whether to implement the acts in accordance with the counting mode (e.g., as shown in FIG. 4) or, alternatively, the acts in accordance with the sampling mode (e.g., as shown in FIG. 5). Accordingly, where the row hammer detection system 110 may be configured to check the ASR bit in response to each detected row activation, the ASR bit may act as a signal or trigger to implement one of the respective operational modes (i.e., counting mode or sampling mode). In this example, therefore, setting the ASR value to "on" would trigger the sampling mode for each subsequently detected activation row until the row hammer detection system 110 receives instructions to re-engage the counting mode.

As noted above, in one or more embodiments, the sampling mode is activated for a specific memory sub-bank. Indeed, in one or more examples described herein, the decision to transition between the counting mode and sampling mode will be performed on a sub-bank by sub-bank basis. Thus, where a sampling mode is activated for a first sub-bank, the row hammer detection system 110 may continue to maintain access counts for other memory sub-banks of the same memory bank (and other memory banks) while implementing the sampling mode for the first memory sub-bank. In one or more embodiments, the row hammer detection system 110 may simultaneously perform a sampling mode on multiple sub-banks while implementing the counting mode on other (multiple) memory sub-banks.

Upon activating the sampling mode and setting the relevant parameters, sampling threshold, and other values, the row hammer detection system 110 may perform an act 520 of detecting an activation of a next address. For example, similar to one or more embodiments described above, the row hammer detection system 110 may identify an activation command including a corresponding address and sub-bank identifier. As discussed above, the row hammer detection system 110 may identify the relevant sub-bank based on the sub-bank identifier from the activation command.

As shown in FIG. 5, the row hammer detection system 110 may perform an act 530 of generating a random number. In one or more embodiments, the row hammer detection system 110 utilizes a linear feedback shift register (LFSR) (or other more robust mechanism) on the memory controller 108 to generate the random number. As noted above, the range of potential random numbers may be determined when the sampling mode is activated and the various thresholds and parameters for the sampling mode are determined.

As further shown, the row hammer detection system 110 may perform an act 540 of determining whether the random number is within a sampling threshold. As noted above, the sampling threshold may be determined upon activating the sampling mode. In at least one example described herein, the random number is compared to sampling probability register (SPR) value. The implementation of the source of randomness may dictate the specific value of the sampling threshold (e.g., how large the SPR value needs to be).

As noted above, the specific value(s) of the SPR and threshold may be determined based on hardware specifications of the memory controller 108 as well as an acceptable probability that a given row hammer attack may go unmitigated prior to causing data to be corrupted. In particular, the sampling threshold(s) may be determined to achieve a failure rate at or below a threshold value. In one or more embodiments described herein, the sampling thresholds may be determined based on a maximum activation count (MAC) metric that measures a number of activations a row can sustain until bits in an adjacent (or nearby) row starts to flip. This MAC value may represent a minimum recorded number of activations of a given row that causes bits in a nearby row (e.g., adjacent row) to flip. In one or more embodiments described herein, a MAC value may refer to approximately 1,000. Nevertheless, other memory hardware 120 may have different MAC values, which would result in different sampling threshold values (e.g., as indicated in the table above).

As shown in FIG. 5, where the random number is not within the sampling threshold, the row hammer detection system 110 may return to act 520 and detect activation of a next row address. In this event, the row hammer detection system 110 may issue no refresh command for a given row address. Conversely, where the row hammer detection system 110 determines that the random number is within the sampling threshold, the row hammer detection system 110 may perform an act 550 of generating a refresh command.

The refresh command may include any command sent from the memory controller 108 to the memory hardware 120 to facilitate refreshing one or more rows of memory corresponding to the suspected row hammer attack. For example, in one or more embodiments, the refresh command includes a command indicating a particular row or range of rows and instructions that enable the memory hardware 120 to locally execute a refresh command on the particular row of memory. In one or more embodiments, the refresh command is a directed refresh management (DRFM) command having a hardware-specific scheme (e.g., a double data rate (DDR) scheme, such as DDR5) in which a memory controller reports the identity of an aggressor row and asks the memory hardware 120 (e.g., a DRAM device) to refresh all victims affected by a given aggressor row.

In one or more embodiments, the refresh command includes an indication of a blast radius. For example, the row hammer detection system 110 may generate and issue a refresh command indicating a row that is suspected as an aggressor row in combination with a blast radius of a predetermined number of rows (e.g., two rows) defining a threshold distance from the aggressor row. The blast radius may indicate both the aggressor row and row(s) on either side of the aggressor row within the threshold distance as row addresses that should be refreshed in response to the refresh command. In one or more embodiments, the row hammer detection system 110 simply identifies the aggressor row and an associated blast radius (or the blast radius is locally determined by the memory hardware 120). Alternatively, the row hammer detection system 110 may simply send a refresh command (e.g., a DRFM command) for each of the affected rows including the aggressor row and one or more rows (e.g., depending on the blast radius) on each side of the aggressor row.

As mentioned above, in one or more embodiments, the row hammer detection system 110 may limit a number of refresh commands issued for a given period of time. For example, in one or more embodiments, the row hammer detection system 110 may be limited to issuing a limited number of commands per memory bank for a given interval of time. In one or more embodiments described herein, the row hammer detection system 110 may be limited to a single refresh command every 7.8 microseconds.

To prevent the row hammer detection system 110 from violating this restriction of the memory system 106, the row hammer detection system 110 may track issued refresh commands over predetermined intervals (e.g., 7.8 microsecond intervals) to ensure that the row hammer detection system 110 does not issue more than the threshold number of commands over the predetermined interval (for a particular memory bank). In one or more embodiments, the row hammer detection system 110 may issue only one refresh command for a given memory bank within the predetermined interval. The predetermined number of commands as well as the predetermined interval may be known or otherwise determined based on specifications of the memory hardware 120.

Figure 6A:
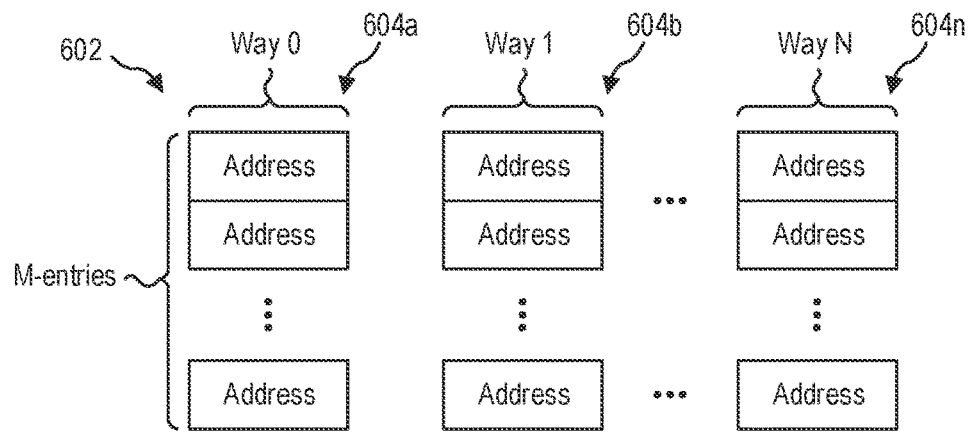
FIG. 6A illustrates an example refresh command record showing a count of refresh commands generated and issued by a memory controller within a predetermined period of time.
Figure 6A:
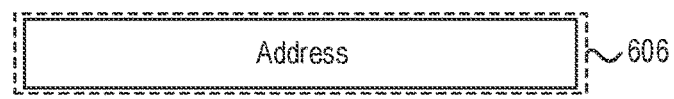

FIG. 6A illustrates an example refresh command table 602 in accordance with one or more embodiments. Similar to the example access count record 202 discussed above, the refresh command table 602 may be maintained on a memory structure (e.g., an SRAM structure) on the memory controller 108. For example, in the example shown in FIG. 6A, the row hammer detection system 110 may maintain an SRAM structure having a plurality of parallel ways 604a-n (e.g., thirty-two ways) that each include M-entries (e.g., sixty-four entries). By maintaining or otherwise utilizing thirty-two parallel ways, the row hammer detection system 110 may ensure that there will nearly always be an empty entry within the refresh command table 602 to place an address for a corresponding refresh command. As shown in FIG. 6A, the row hammer detection system 110 may place the address within a corresponding entry based on a received refresh command 606 that includes an indicated aggressor address (e.g., an aggressor row address).

Figure 6B:
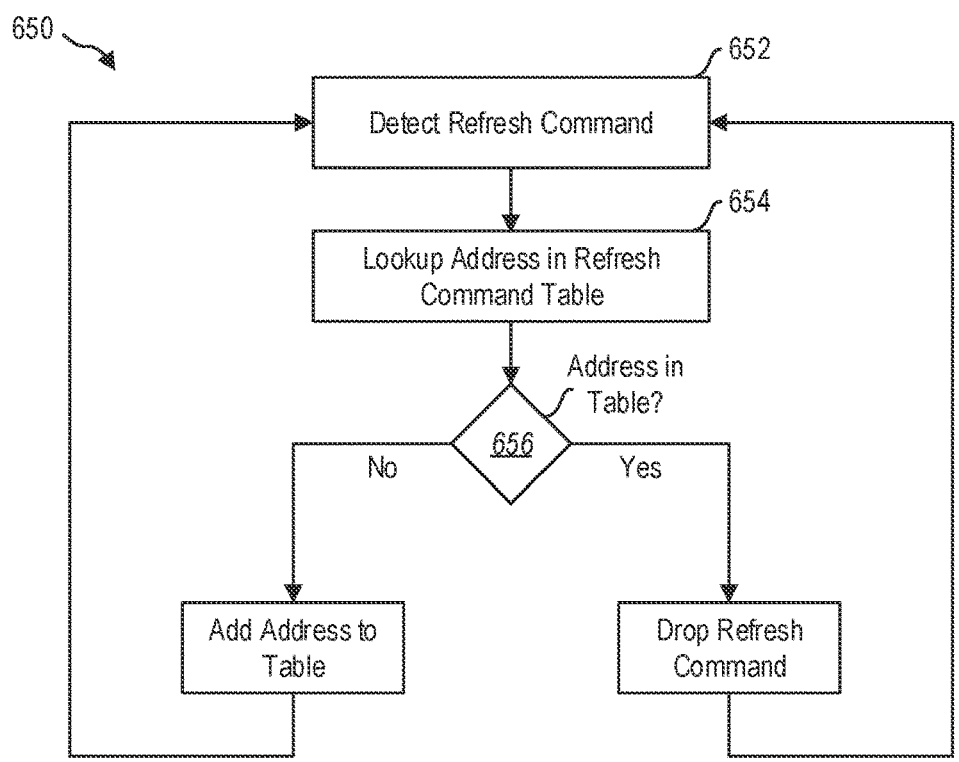
FIG. 6B illustrates an example series of acts for determining whether to issue a refresh command based on information from the refresh command record.

FIG. 6B illustrates a series of acts 650 involved in utilizing the refresh command table 602 to ensure that the row hammer detection system 110 does not exceed a threshold number of refresh commands for a given memory bank within a predetermined interval of time. As mentioned above, the row hammer detection system 110 may refresh the values from the refresh command table 602 at a predetermined interval (e.g., a refresh interval). For example, prior to or after performing the series of acts 650 shown in FIG. 6B, the row hammer detection system 110 may determine if a refresh interval has passed and, if it has, clear all values from the refresh command table 602.

As shown in FIG. 6B, the row hammer detection system 110 may perform an act 652 of detecting a refresh command. As noted above, this may be based on the row hammer detection system 110 implementing a sampling mode with respect to a memory sub-bank and generating the refresh command based on a comparison of a random number and a sampling threshold. In the example shown in FIG. 6B, the row hammer detection system 110 may perform the series of acts 650 prior to issuing the refresh command. For instance, the row hammer detection system 110 may perform the series of acts 650 after generating, but prior to issuing the refresh command.

As further shown in FIG. 6B, the row hammer detection system 110 may identify an address included in the refresh command and perform an act 654 of looking up the address in the refresh command table 602. As shown in FIG. 6B, the row hammer detection system 110 may perform an act 656 of determining whether the address from the refresh command is included within the refresh command table 602.

Where the address is not in the table, the row hammer detection system 110 may perform an act 658 of issuing the refresh command. Alternatively, where the address is in the table (i.e., a refresh command for the memory address has been issued within a predetermined interval of time), the row hammer detection system 110 may perform an act 660 of discarding the command. In one or more embodiments, the row hammer detection system 110 may quietly discard the command knowing that a refresh command has very recently been issued for the same address and trust that a row hammer attack would not cause the bits of the corresponding rows to be corrupted within such a short amount of time. Further, dropping the command in this scenario would prevent the row hammer detection system 110 from violating specifications of the memory hardware 120 in issuing a refresh command more than once within the predetermined time interval for an associated memory bank. As shown in FIG. 6B, after performing each of acts 658 and 660, the row hammer detection system 110 may return to act 652 and detect a next refresh command.

Figure 7:
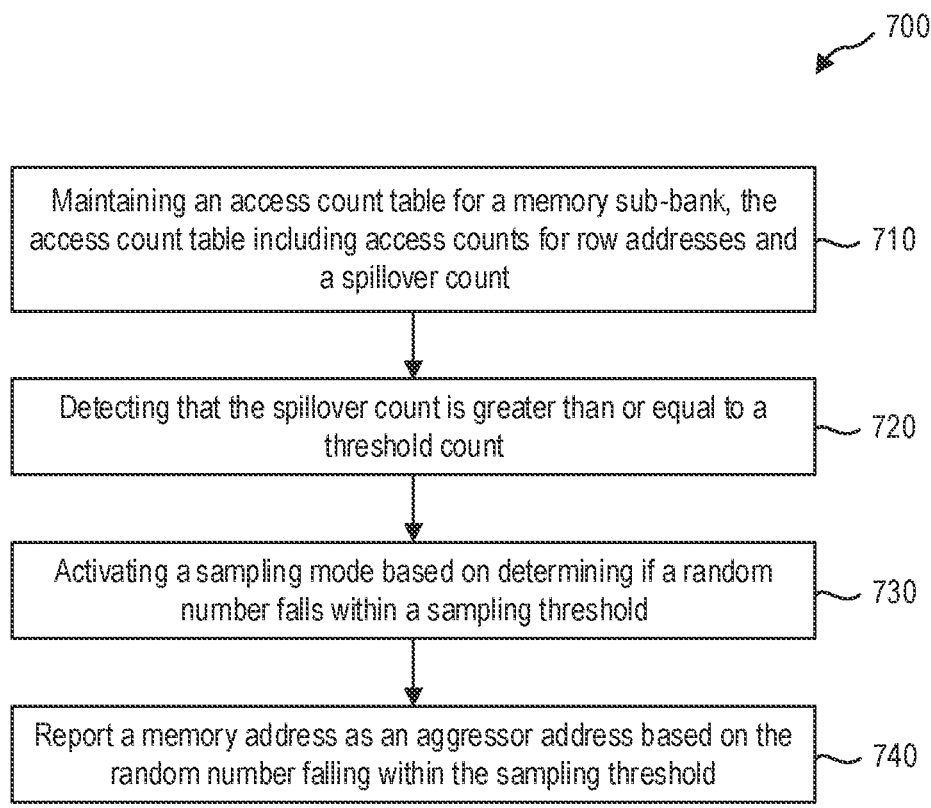
FIG. 7 illustrates a series of acts for detecting and mitigating row hammer attacks in a memory system in accordance with one or more embodiments.

Turning now to FIG. 7, this figure illustrates an example flowchart including a series of acts for detecting and mitigating a suspected row hammer attack on a row address of a memory hardware (e.g., DRAM device). While FIG. 7 illustrates acts according to one or more embodiments, alternative embodiments may omit, add to, reorder, and/or modify any of the acts shown in FIG. 7. The acts of FIG. 7 can be performed as part of a method. Alternatively, a non-transitory computer-readable medium can include instructions that, when executed by one or more processors, cause a computing device (e.g., a server device) to perform the acts of FIG. 7. In still further embodiments, a system can perform the acts of FIG. 7.

FIG. 7 illustrates a series of acts 700 for detecting an mitigating a suspected row hammer attack on a row address of a memory hardware (e.g., DRAM device). In one or more embodiments, the series of acts 700 are implemented by a memory controller for detecting and mitigating a row hammer attack on one or more memory rows of a DRAM device. As shown in FIG. 7, the series of acts 700 includes an act 710 of maintaining an access count table for a memory sub-bank, the access count table including access counts for row addresses and a spillover count. In one or more implementations, the act 710 involves maintaining an access count table for a memory sub-bank, the access count table including a plurality of access counts indicating estimated activation counts for associated memory row addresses within the memory sub-bank and a spillover count based on memory row accesses for at least one memory row address not included within the access count table.

As further shown, the series of acts 700 may include an act 720 of detecting that the spillover count is greater than or equal to a threshold count. In one or more embodiments, the act 720 involves detecting that the spillover count is greater than or equal to a threshold count, the threshold count being associated with a prediction of a possible aggressor row from the memory sub-bank.

As further shown, the series of acts 700 may include an act 730 of activating a sampling mode based on determining if a random number falls within a sampling threshold. In one or more embodiments, the act 730 involves, based on detecting that the spillover count is greater than or equal to the threshold count, activating a sampling mode for the memory sub-bank by generating a random number and determining if the random number falls within a sampling threshold.

As further shown, the series of acts 700 may include an act 740 of reporting a memory address as an aggressor address based on the random number falling within the sampling threshold. In one or more embodiments, the act 740 involves reporting a memory row address as an aggressor address based on whether the random number falls within the sampling threshold.

In one or more embodiments, the series of acts 700 includes maintaining a plurality of access count tables for a plurality of memory sub-banks including the memory sub-bank, the plurality of memory sub-banks corresponding to a memory bank of the DRAM device. In one or more embodiments, activating the sampling mode for the memory sub-bank includes selectively activating the sampling mode while continuing to maintain additional access count tables from the plurality of access count tables for other sub-banks from the plurality of memory sub-banks.

In one or more embodiments, maintaining the access count table includes detecting an activation of a first memory row address on the memory sub-bank, determining that the first memory row address is not included within the access count table, and incrementing the spillover count based on determining that the first memory row address is not included within the access count table. In one or more embodiments, incrementing the spillover count causes the spillover count to be greater than or equal to the threshold count. In one or more embodiments, the series of acts 700 includes periodically clearing the access count table at a predetermined interval of time.

In one or more embodiments, activating the sampling mode includes determining the sampling threshold based on a maximum activation count (MAC) determined for the DRAM device. In one or more embodiments, determining if the random number falls within the sampling threshold includes determining whether the random number is less than the sampling threshold. IN one or more embodiments, a probability of the random number falling within the sampling threshold decreases as the MAC determined for the DRAM device increases.

In one or more embodiments, reporting the memory row address as an aggressor address includes reporting a blast radius of two or more address rows to the DRAM device. In one or more embodiments, reporting the memory row address as an aggressor address includes issuing a refresh command that causes the DRAM device to refresh an address row of the aggressor address and one or more additional address rows adjacent to the address row. In one or more embodiments, the access count table is maintained in an SRAM structure on a memory controller coupled to the DRAM device.

Figure 8:
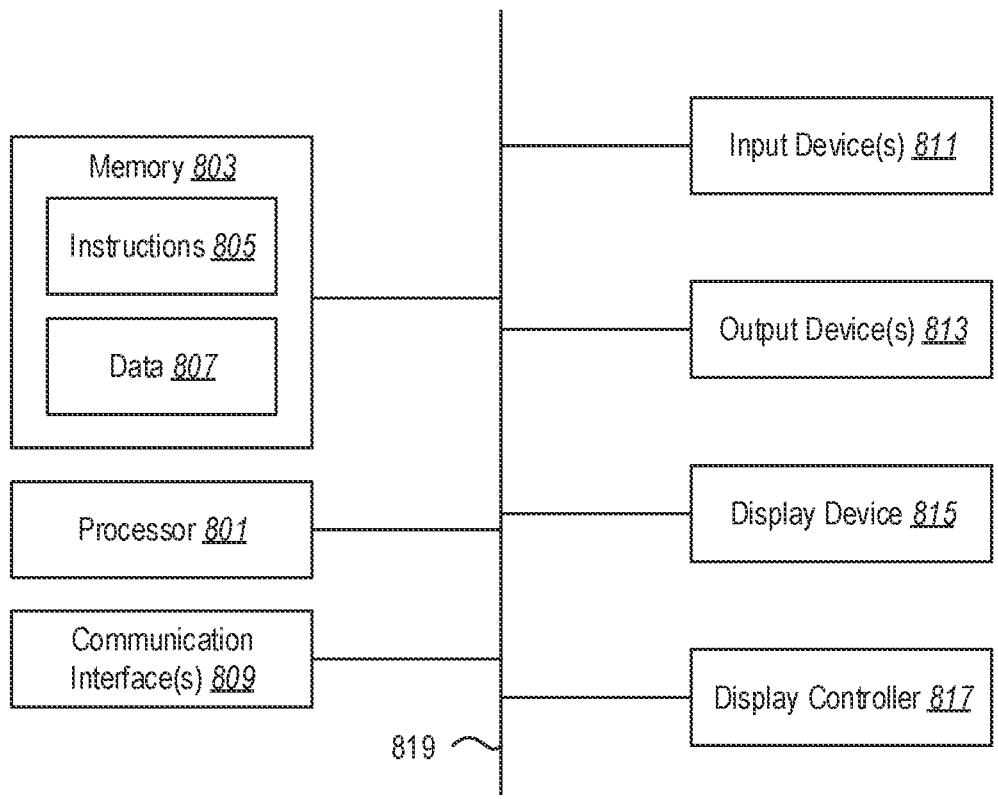
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method implemented by a memory controller for detecting and mitigating a row hammer attack on one or more memory rows of a dynamic random access memory (DRAM) device, comprising:
maintaining an access count table for a memory sub-bank, the access count table including memory row addresses within the memory sub-bank, a plurality of access counts indicating estimated activation counts for the memory row addresses, and a spillover count based on memory row accesses for at least one memory row address not included within the access count table;
detecting that the spillover count is greater than or equal to a threshold count, the threshold count being associated with a prediction of a possible aggressor row from the memory sub-bank;
based on detecting that the spillover count is greater than or equal to the threshold count, activating a sampling mode for the memory sub-bank by generating a random number and determining if the random number falls within a sampling threshold; and
reporting a memory row address as an aggressor address corresponding to the possible aggressor row based on whether the random number falls within the sampling threshold.

2. The method of claim 1, further comprising maintaining a plurality of access count tables for a plurality of memory sub-banks including the memory sub-bank, the plurality of memory sub-banks corresponding to a memory bank of the DRAM device.

3. The method of claim 2, wherein activating the sampling mode for the memory sub-bank comprises selectively activating the sampling mode while continuing to maintain additional access count tables from the plurality of access count tables for other sub-banks from the plurality of memory sub-banks.

4. The method of claim 1, wherein maintaining the access count table includes:
detecting an activation of a first memory row address on the memory sub-bank;
determining that the first memory row address is not included within the access count table; and
incrementing the spillover count based on determining that the first memory row address is not included within the access count table.

5. The method of claim 4, wherein incrementing the spillover count causes the spillover count to be greater than or equal to the threshold count.

6. The method of claim 1, further comprising periodically clearing the access count table at a predetermined interval of time.

7. The method of claim 1, wherein activating the sampling mode includes determining the sampling threshold based on a maximum activation count (MAC) determined for the DRAM device, wherein determining if the random number falls within the sampling threshold includes determining whether the random number is less than the sampling threshold.

8. The method of claim 7, wherein a probability of the random number falling within the sampling threshold decreases as the MAC determined for the DRAM device increases.

9. The method of claim 1, wherein reporting the memory row address as the aggressor address includes reporting a blast radius of two or more address rows to the DRAM device.

10. The method of claim 1, wherein reporting the memory row address as the aggressor address includes issuing a refresh command that causes the DRAM device to refresh an address row of the aggressor address and one or more additional address rows adjacent to the address row.

11. The method of claim 1, wherein the access count table is maintained in an SRAM structure on a memory controller coupled to the DRAM device.

12. The method of claim 1, further comprising:
maintaining a record of reporting commands issued by the memory controller; and
reporting the memory row address based on the memory row address not being included within the record of reporting commands, when each value of the record of reporting commands is cleared at a predetermined interval of time, the predetermined interval of time being determined based on hardware specifications of the DRAM device.

13. A system, comprising:
a dynamic random access memory (DRAM) device including a plurality of memory banks, each memory bank from the plurality of memory banks including a plurality of memory sub-banks; and
a memory controller coupled to the DRAM device, the memory controller being configured to:
  maintain an access count table for a memory sub-bank, the access count table including memory row addresses within the memory sub-bank, a plurality of access counts indicating estimated activation counts for the memory row addresses, and a spillover count based on row activations for at least one memory row address not included within the access count table;
  detect that the spillover count is greater than or equal to a threshold count, the threshold count being associated with a prediction of a possible aggressor row from the memory sub-bank;
  based on detecting that the spillover count is greater than or equal to the threshold count, activate a sampling mode for the memory sub-bank by generating a random number and determining if the random number falls within a sampling threshold; and
  report a memory row address as an aggressor address corresponding to the possible aggressor row based on whether the random number falls within the sampling threshold.

14. The system of claim 13, wherein the memory controller is further configured to maintain a plurality of access count tables for the plurality of memory sub-banks, and wherein activating the sampling mode for the memory sub-bank comprises selectively activating the sampling mode while continuing to maintain additional access count tables from the plurality of access count tables for other sub-banks from the plurality of memory sub-banks.

15. The system of claim 13, wherein maintaining the access count table includes:
  detecting an activation of a first memory row address on the memory sub-bank;
  determining that the first memory row address is not included within the access count table; and
  incrementing the spillover count based on determining that the first memory row address is not included within the access count table, wherein incrementing the spillover count causes the spillover count to be greater than or equal to the threshold count.

16. The system of claim 13, wherein activating the sampling mode includes determining the sampling threshold based on a maximum activation count (MAC) determined for the DRAM device, wherein determining if the random number falls within the sampling threshold includes determining whether the random number is less than the sampling threshold.

17. The system of claim 13, wherein reporting the memory row address as the aggressor address includes:
  reporting a blast radius of two or more address rows to the DRAM device; or
  issuing a refresh command that causes the DRAM device to refresh an address row of the aggressor address and one or more additional address rows adjacent to the address row.

18. A memory controller, the memory controller being configured to:
  maintain an access count table for a memory sub-bank, the access count table including memory row addresses within the memory sub-bank, a plurality of access counts indicating estimated activation counts for the memory row addresses, and a spillover count based on row activations for at least one memory row address not included within the access count table;
  detect that the spillover count is greater than or equal to a threshold count, the threshold count being associated with a prediction of a possible aggressor row from the memory sub-bank;
  based on detecting that the spillover count is greater than or equal to the threshold count, activate a sampling mode for the memory sub-bank by generating a random number and determining if the random number falls within a sampling threshold; and
  report a memory row address as an aggressor address corresponding to the possible aggressor row based on whether the random number falls within the sampling threshold.

19. The memory controller of claim 18, the memory controller being configured to maintain a plurality of access count tables for a plurality of memory sub-banks including the memory sub-bank, the plurality of memory sub-banks corresponding to a memory bank of a dynamic random access memory (DRAM) device, wherein activating the sampling mode for the memory sub-bank comprises selectively activating the sampling mode while continuing to maintain additional access count tables from the plurality of access count tables for other sub-banks from the plurality of memory sub-banks.

20. The memory controller of claim 18, wherein reporting the memory row address as the aggressor address includes;
  reporting a blast radius of two or more address rows to a dynamic random access memory (DRAM) device; or
  issuing a refresh command that causes the DRAM device to refresh an address row of the aggressor address and one or more additional address rows adjacent to the address row.

* * * * *